Figure 1:
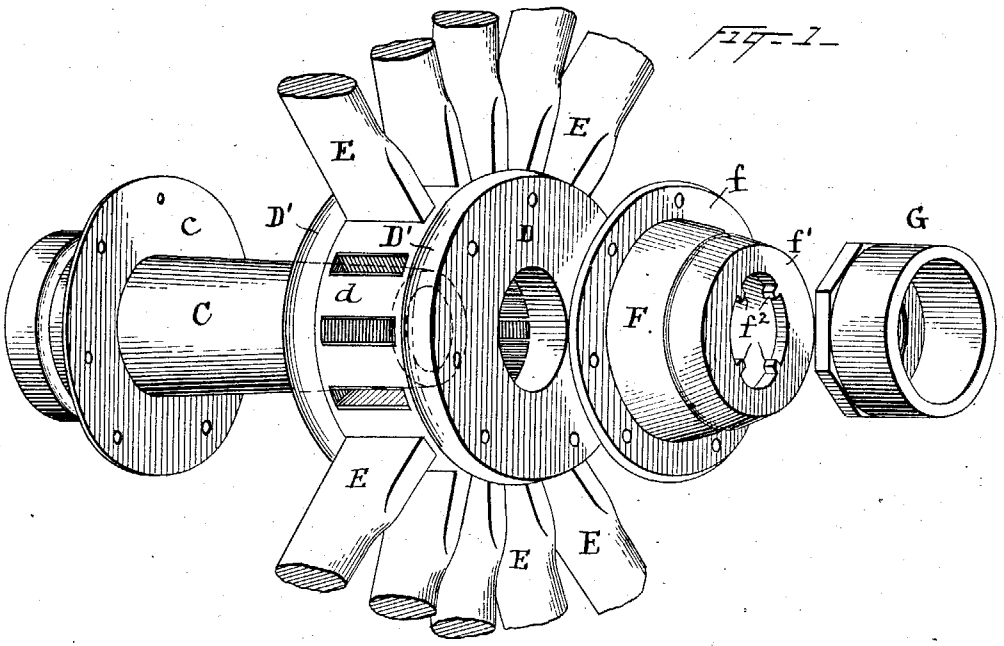

No. 12,203. REISSUED MAR. 8, 1904.

E. SENDELBACH.

VEHICLE HUB.

APPLICATION FILED DEC. 3, 1901.

3 SHEETS—SHEET 1.

Witnesses

Morris A. Clark.

M. H. Watkins

Inventor

Edward Sendelbach by Geo. P. Whittlesey

Attorney

No. 12,203. REISSUED MAR. 8, 1904.

E. SENDELBACH.

VEHICLE HUB.

APPLICATION FILED DEC. 3, 1901.

3 SHEETS—SHEET 2.

Witnesses
Morris A. Clark.
M. H. Hathine

Inventor
Edward Sendelbach
by Geo. P. Whittlesey.
Attorney

No. 12,203.

REISSUED MAR. 8, 1904.

E. SENDELBACH.

VEHICLE HUB.

APPLICATION FILED DEC. 3, 1901.

3 SHEETS—SHEET 3.

Witnesses

Louis A. Clark.

M. H. Watkins.

Inventor

Edward Sendelbach, by Geo. P. Whittemore.

Attorney

No. 12,203. Reissued March 8, 1904.

UNITED STATES PATENT OFFICE.

EDWARD SENDELBACH, OF TERRE HAUTE, INDIANA, ASSIGNOR OF ONE-HALF TO CHARLES MINSHALL, OF TERRE HAUTE, INDIANA.

VEHICLE-HUB.

SPECIFICATION forming part of Reissued Letters Patent No. 12,203, dated March 8, 1904.

Original No. 651,276, dated June 5, 1900. Application for reissue filed December 3, 1901. Serial No. 84,577.

*To all whom it may concern:*

Be it known that I, EDWARD SENDELBACH, a citizen of the United States, residing at Terre Haute, in the county of Vigo and State of Indiana, have invented certain new and useful Improvements in Vehicle-Hubs; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to vehicle-wheels, and more especially to the construction of the hub. Its object is to provide a wheel in which the desirable qualities of the common wooden hub shall be combined with those of a metallic hub. In the old-fashioned wooden hub, such as is still in use for farm-wagons and heavy carts, the spokes are driven into mortises or sockets in a wooden nave, and thus they have a certain amount of elasticity or cushion, which enables them the better to resist the various strains to which the wheel is subjected. A metallic hub can be made much smaller in its dimensions than a wooden hub, and therefore neater in appearance. It is also more durable, since the wooden hub is liable to check or crack, thus impairing its efficiency; but if the hub is made entirely of metal the wooden spokes are liable to become weakened along the lines where they are rigidly clamped by the metallic flanges which hold them in place, so that they tend to break off at these places. It has been proposed to make composite hubs partly of wood and partly of metal; but so far as I am aware these devices have not been very practical, possessing some points of weakness or other fault in their design, so that they have not come into general use. For instance, prior inventors have proposed to make a hub with a wooden center inclosed by cup-shaped flanges on a metal box; but I have found by experiment that such a construction is not commercially practicable, because when the parts of such a hub are clamped together the wedging action of the ends of the wooden center results in bursting the cup-shaped flanges. In my invention I aim to avoid these difficulties and objections and produce a hub which has all the elasticity of the old wooden hub and the smaller dimensions and strength of the metal hub. I use a wooden center, which is substantially the old wooden hub with its ends cut off, and I provide this with a metal box and use metal clamping-plates to hold it in place on the box; but these plates are arranged so as not to touch the spokes. Moreover, the meeting surfaces between these plates and the ends of the wooden center are in planes at right angles with the axis of the box, so that the clamping effect is wholly at right angles with said surfaces, and therefore there is no tendency to strain and break the plates.

Figure 2:
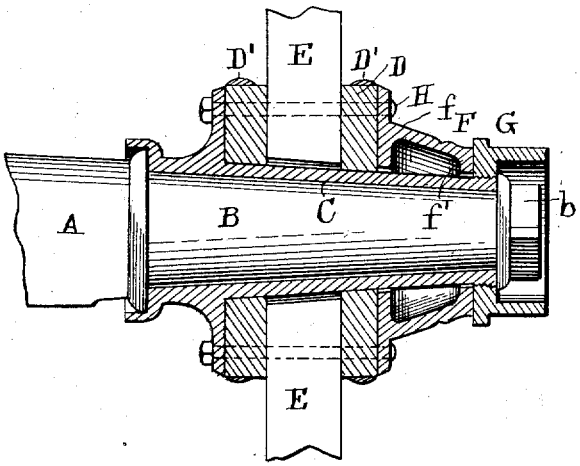
Figure 3:
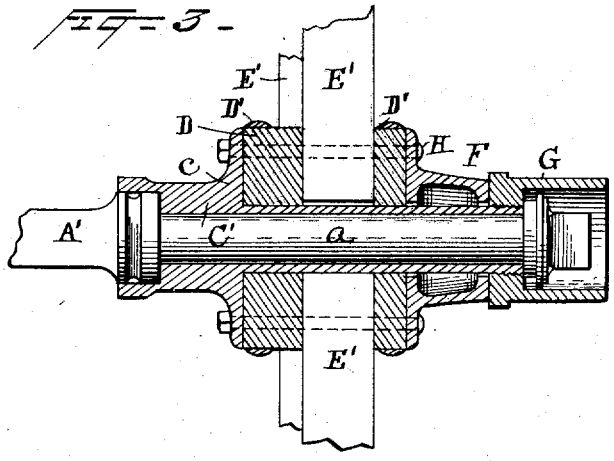
Figure 4:
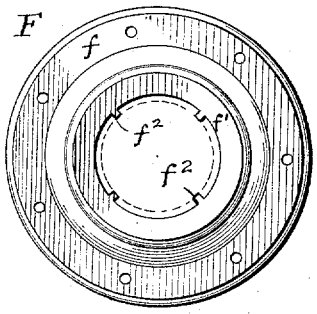
Figure 5:
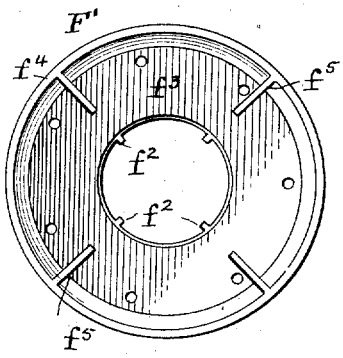
Figure 3:
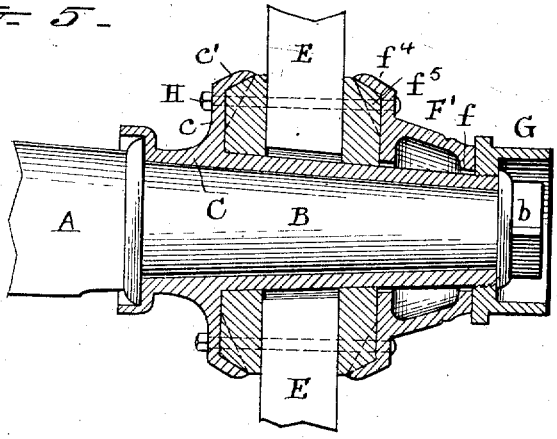

In the drawings, Figure 1 is a perspective view showing the several parts of the hub separated. Fig. 2 is a longitudinal section of the hub with the parts assembled. Fig. 3 is a similar view of a modified form of hub. Fig. 4 is an end view of one of the clamping-plates. Fig. 5 is a longitudinal section of a further modification. Fig. 6 is an elevation of one of the clamping-plates used in this modification.

Figs. 1 and 2 show a hub suitable for a farm-wagon or a large cart. The axle A is provided with the usual tapering skein B and nut *b*. On this skein fits the tapering box C, which has at or near one end a collar or clamping-plate *c*, whose outer face is in a plane at right angles with the axis of the box. This collar fits against the inner end of the wooden center D, which, as shown in Fig. 1, is in reality a short wooden hub provided with the usual radial mortises *d* for the spokes E and a central longitudinal bore for the box C. The ends of this wooden center are flat and parallel, being in planes at right angles with the axis of the box. Metallic bands D′ are shrunk around the ends of the center D′ as in the ordinary wooden hub, to keep it from checking. These bands do not come in contact with the spokes, as clearly shown in Fig. 2. The opposite clamping-plate consists of a flange *f* on a sleeve F, resting squarely against the outer end of the center D and fitting loosely on the box C. The outer end of the sleeve has an internal flange $f'$, also fitting loosely on the box. It is preferred to make one or both of these flanges with three or more lugs $f^4$, which can be dressed off with a file, so as to insure a proper centering of the sleeve on the box. The outer end of the box is screw-threaded to receive a screw-threaded point-band G, by means of which the center D is tightly clamped between the collar $c$ and the flange $f$. Bolts H are passed through the collar, center, and flange between every two or more spokes and resist any strain tending to break off the collar or the outer edge of the flange. These bolts also prevent the wooden center D from turning inside the clamping-plates in case the box should run dry and stick on the skein.

It will be seen that this hub combines all the good points of the old clumsy wooden hub and the smaller and stronger but inelastic metal hub, the result being a hub which is elastic and yet not too large, while possessing great strength and a neat appearance. No amount of clamping pressure can strain or break the clamping-plates, which bear evenly against the flat ends of the wooden center substantially over their entire surface.

In assembling the hub the turned, bored, mortised, and banded wooden portion is placed upon the box with one end in contact with the collar. The sleeve is then slipped onto the box and brought up against the other end of the wooden portion. The bolts are then driven through the holes provided for them and the nuts put on and tightened up, thus clamping the wooden portion firmly between the collar and sleeve and uniting all these parts into a solid rigid structure. The spokes are then driven in the usual manner, either by hand or by machine. Owing to the comparatively short distance between the ends of the mortises and the ends of the wooden portion, the operation of driving the spokes causes the wood to be compressed, compacted, and solidified, not only between the mortises, but also between the edges of the spoke-tenons and the clamping-plates. This result cannot be obtained in a hub having its wooden portion of any considerable length and enables my hub to withstand lateral strains far better than any with which I am familiar, yet it still retains the cushioning action due to the wood-in-wood construction and does not have the absolute rigidity of an all-metal hub.

The hub can be readily taken apart for repairs and is easily understood by any wagon-smith.

The modification shown in Fig. 3 illustrates the mode of adapting this invention to wheels for metallic axles, such as light buggy-wheels. The axle A′ has the usual cylindrical skein or bearing $a$, to which is fitted the box C′. The spokes E′ are staggered; but otherwise the construction is the same as that shown in Figs. 1 and 2, only smaller and lighter.

Fig. 5 shows how the bands D′ can be dispensed with and their function performed by flaring flanges on the collar and the sleeve. The ends of the center are beveled or chamfered off to fit the inside of these flaring flanges $c'$ $f^6$. To prevent these flanges from being split open and broken off by the clamping pressure when the hub is assembled, there may be provided ribs or buttresses $f^5$, running from the edges of said flanges to the body of the collar $c$ or the flange $f^6$ and let into radial grooves cut in the ends of the center D; but this construction requires considerable care in making and fitting, and I prefer that shown in Figs. 1 and 2 or Fig. 3, since I find that with my flat collar and flange set at right angles to the axis of the box there is no tendency to break them, because no wedging action can be set up.

My hub has been carefully designed to meet a known want in the trade, and its simplicity, low cost of manufacture, ease of repair, compactness, strength, and elasticity are believed to render it a decided improvement in the art.

So far as I am aware no one has heretofore made a composite wood-and-metal hub having a wooden center to receive driven spokes, said center being cylindrical and provided with parallel ends lying in planes at right angles with its axis.

Having thus described my invention, what I claim, and desire to secure by Letters Patent, is—

1. As a new article of manufacture, a wooden center for a hub, consisting of a short cylindrical block having ends lying in planes at right angles with its axis, radial mortises for the spoke-tenons, a central longitudinal bore, and metallic bands encircling it at its ends, said bands lying entirely outside of the line of the spoke-mortises.

2. The combination with a short cylindrical wooden block having its ends substantially at right angles with its axis, and provided with a central longitudinal bore and radial spoke-mortises, of separate metallic bands encircling it at its ends, and spokes driven into the radial mortises, said wooden portion being compacted and solidified between its ends and the spoke-tenons.

3. The combination with a short cylindrical mortised wooden block having flat ends, of metallic clamping-plates fitting tightly against said ends substantially over their entire surface, separate metallic bands encircling said ends, and spokes driven into said mortises and compressing the wood lying between the spoke-tenons and said clamping-plates.

4. The combination with a wooden center having radial mortises and flat ends lying in planes at right angles with the axis of the hub, of a metallic box provided with a collar fitting against one end of said center, a metallic sleeve surrounding said box and having a flange fitting against the other end of the center, means for clamping said parts together, lengthwise, and spokes inserted into the mortises in said center and sustained against lateral pressure by the wooden center only.

5. A vehicle-hub composed of a metallic box having a collar whose outer face lies in a plane at right angles with the axis of the box, a sleeve having a flange at one end loosely fitting said box and having its inner face lying in a plane at right angles with the axis of the box, a wooden center provided with mortises for the spoke-tenons and having flat ends at right angles with the axis of the hub and provided with encircling bands of metal lying entirely outside of the line of the spoke-mortises, and a point-band screwed on the outer end of the box and adapted to impart an endwise-clamping movement to the sleeve, said center lying between the collar and the flange with its ends in contact therewith substantially over their entire surface.

6. As a new article of manufacture, a sleeve for a hub, having internal flanges at each end, and three or more inwardly-projecting radial lugs on one of said flanges, whereby said sleeve can be centered on a hub-box by dressing off the ends of said lugs.

7. As a new article of manufacture, a sleeve for a hub, having internal flanges at each end at right angles with the axis of the sleeve, a flaring flange on one end of the sleeve, and radial ribs connecting said flaring flange with the end flange.

In testimony whereof I affix my siguature in presence of two witnesses.

EDWARD SENDELBACH.

Witnesses:

W. C. Clark,

W. H. Crook.